April 8, 1952        B. M. OLIVER        2,591,856

PULSE ECHO DISTANCE INDICATOR

Filed Dec. 9, 1944        4 Sheets-Sheet 1

INVENTOR
B. M. OLIVER
BY
ATTORNEY

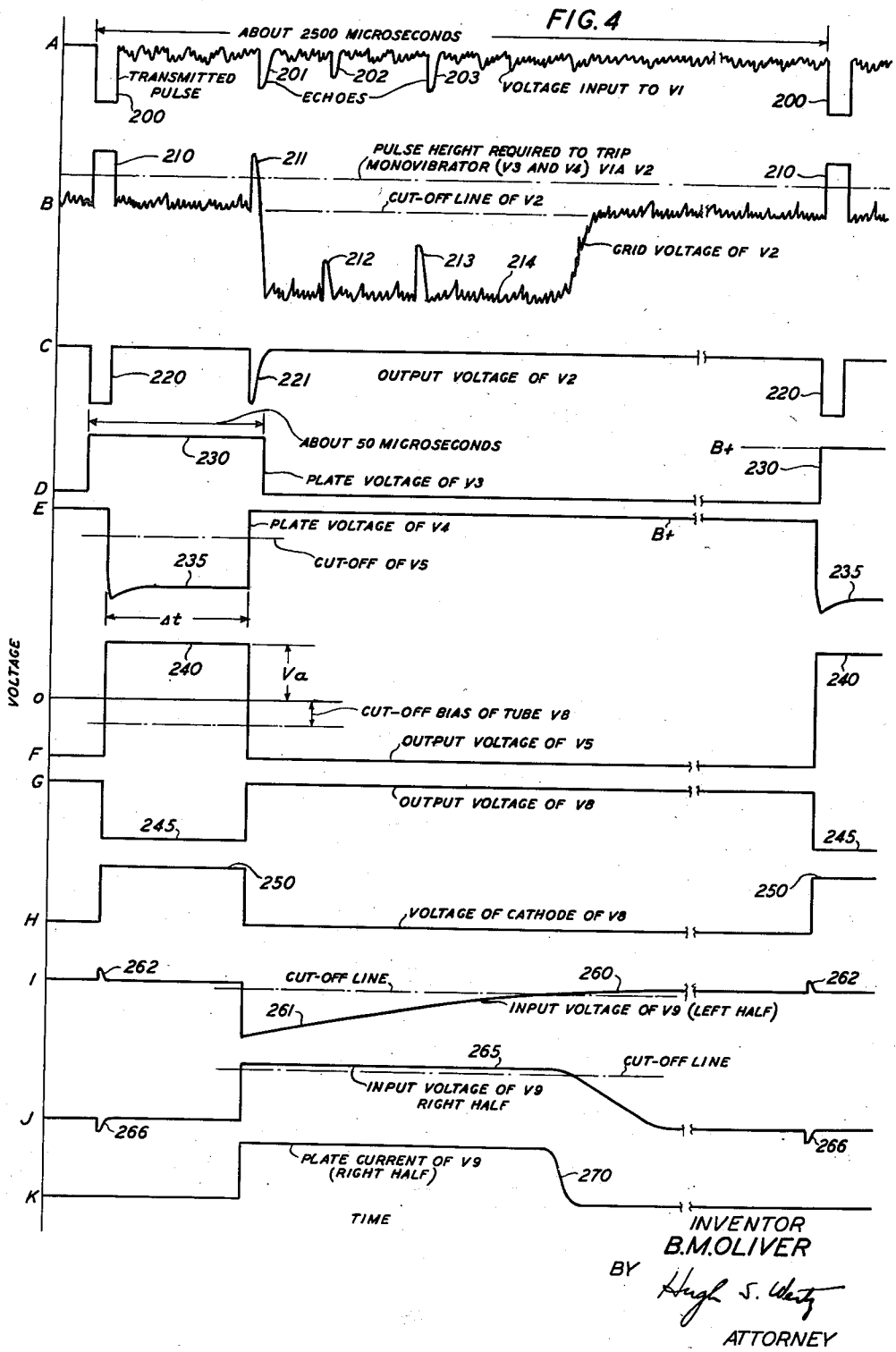

Patented Apr. 8, 1952

2,591,856

UNITED STATES PATENT OFFICE 2,591,856

PULSE ECHO DISTANCE INDICATOR

Bernard M. Oliver, New York, N. Y., assignor to Bell Telephone Laboratories, Incorporated, New York, N. Y., a corporation of New York Application December 9, 1944, Serial No. 567,407

3 Claims. (Cl. 343—13)

This invention relates to pulse-actuated circuits and more specifically to pulse reflection type image locating and distance measuring systems.

In a pulse reflection type image locating and distance measuring system (frequently called a radar), radio frequency pulses are directively emitted, reflections thereof are received from objects upon which the emitted pulses impinge, and the reflection times for particular objects are determined to provide indications of the distances to these objects. Electrical variations received at the receiving point constitute a repeated series of impulses, each cycle of the series comprising, for example, a transmitted pulse and one or more reflections or echo pulses interspersed with and superposed on variations due to noise. The present invention in one of its primary aspects relates to the "interpretation" of the echoes or, in other words, the utilization of these echoes to determine the corresponding distances from the operating station to the particular objects giving rise to the echoes.

It is an object of this invention to provide a new and improved pulse reflection type image locating and distance measuring system which is simple and accurate.

It is another object of this invention to provide new and improved means for accurately indicating the time interval between two time-displaced, relatively short pulses.

In accordance with the invention, there is provided a pulse reflection type image locating and distance measuring system comprising a transmitter, a transmitting antenna for emitting radio frequency pulses (called "transmitted pulses" or "emitted pulses") produced by the transmitter, a receiving antenna, a receiver, and a novel "echo interpreter" for indicating or measuring the distance to the nearest object or other selected one. The echo interpreter comprises two tubes cross-connected to form a monovibrator (a multivibrator circuit in which one tube is so biased that only one cycle is delivered per stimulus, or, in other words, a non-free-running multivibrator circuit) and to which is fed those pulses from the receiver which have passed through a cut-off tube which removes practically all the noise. The monovibrator is initiated by the transmitted pulse and restored by the first echo and thereby forms a pulse the duration of which is substantially equal to the time interval between the transmitted pulse and the first received echo. This pulse produced by the monovibrator is amplified and clipped to form a square-topped pulse having the same duration. A relatively long blocking pulse, starting at the trailing edge of the square-topped pulse, is formed and is fed back to the cut-off tube to make this tube non-conducting to all echoes after the first. Echoes after the first one and before the next transmitted pulse, therefore, have no effect on the monovibrator. The series of square-topped pulses is applied to a filter which passes only the fundamental frequency of the series, 400 per second, for example. The output of the filter is amplified and then rectified. As all of the square-topped pulses are of the same height, the areas of the pulses are proportional to the lengths thereof. The rectified fundamental component is, therefore, substantially proportional to the length of the monovibrator pulse and hence to the range of the object forming the echo.

The invention will be more readily understood by referring to the following description taken in connection with the accompanying drawings forming a part thereof in which:

Figs. 4, 5, and 6 are various graphical representations to aid in understanding the invention.

Figure 1:
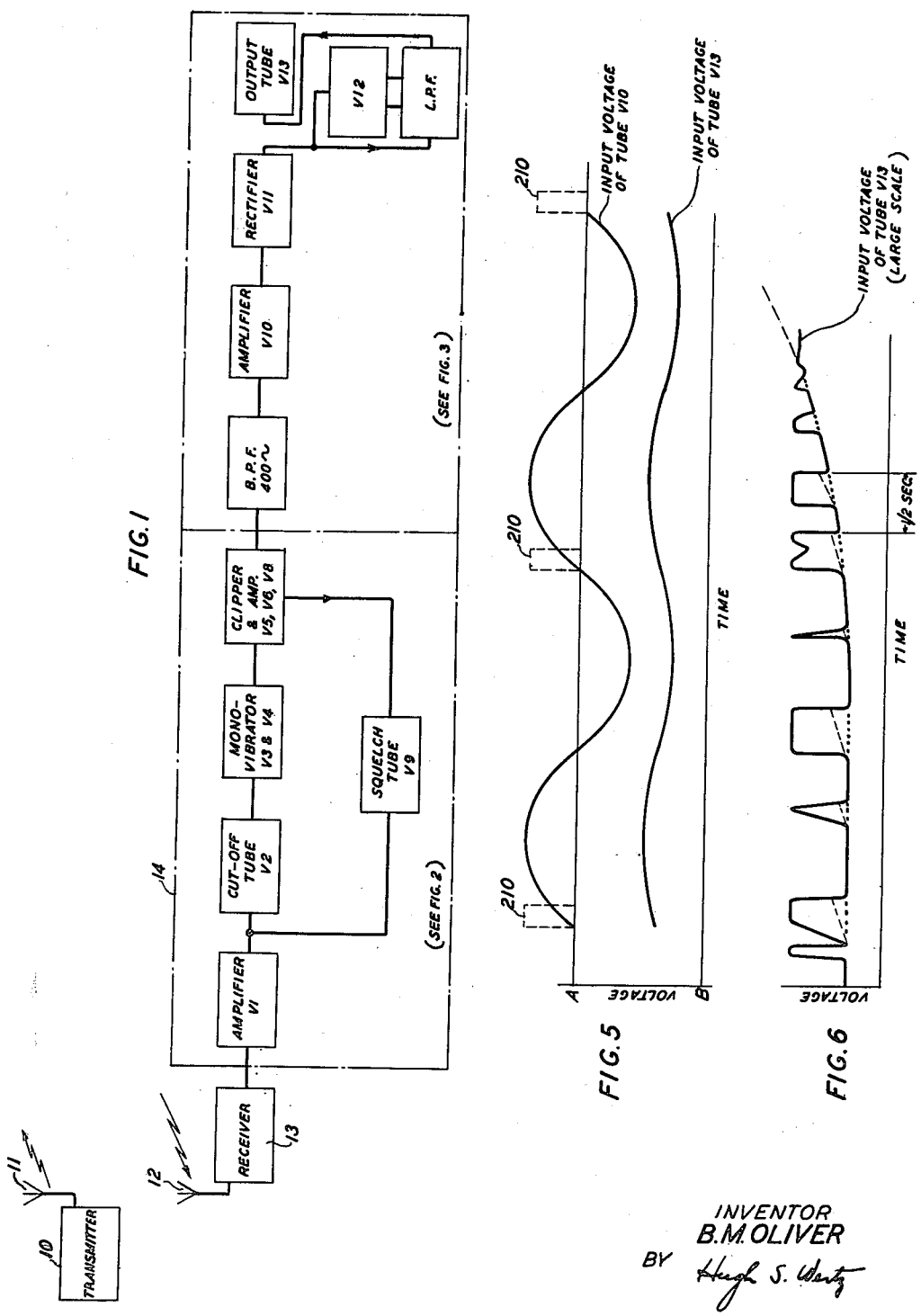
Fig. 1 shows, in block diagram form, a pulse reflection type image locating and distance measuring system in accordance with the invention.

Referring more specifically to the drawings, Fig. 1 shows, by way of example for illustrative purposes and in schematic diagram form, a pulse reflection type image locating and distance measuring system. This figure is not intended to be a circuit diagram but merely a diagram showing the arrangement of the various parts of the system. In the arrangement of Fig. 1, a transmitter 10 is provided to supply ultra-high frequency pulse-modulated radio waves which can be directed at a particular object or objects by means of an antenna 11. By way of example, transmitter 10 can comprise an oscillator for providing a sine wave having a suitable periodicity which can conveniently be 400 cycles per second, for example. This oscillator energizes the pulse generator of any one of several suitable types well known to the art. For example, see United States Patent 2,117,752 issued May 17, 1938 to L. R. Wrathall, which shows a generator which provides an energy pulse at a particular point of each cycle of the input wave provided to it. The pulse from the pulse generator is applied to a carrier generator and modulator of any suitable type and the resultant pulse modulated waves are applied to the transmitting antenna 11. Waves reflected from one or more objects within the range of the transmitting antenna 11 are received by a receiving antenna 12. The antennas 11 and 12 are of any suitable type; for example, they can be of the polystyrene "polyrod" type disclosed in an application of G. E. Mueller, Serial No. 469,284, filed December 17, 1942 and which issued as Patent 2,425,366, on August 12, 1947. The reflected waves picked up by the receiving antenna 12 (and also the transmitted pulses) are applied to a receiver 13 of any suitable form wherein they are amplified, rectified and fed to the echo interpreter 14 of this invention. The input pulse wave to the circuit 14 (indicated in dashed lines in Fig. 1) is shown in Fig. 4 at line A. This pulse wave comprises a transmitted pulse 200, and echo pulses 201, 202, 203, etc. interspersed with spurious or noise variations. If desired, the output of the receiver 13 can be applied to an oscilloscope for direct visual indication of the echo pulses in addition to being applied to the circuit 14.

Figure 2:
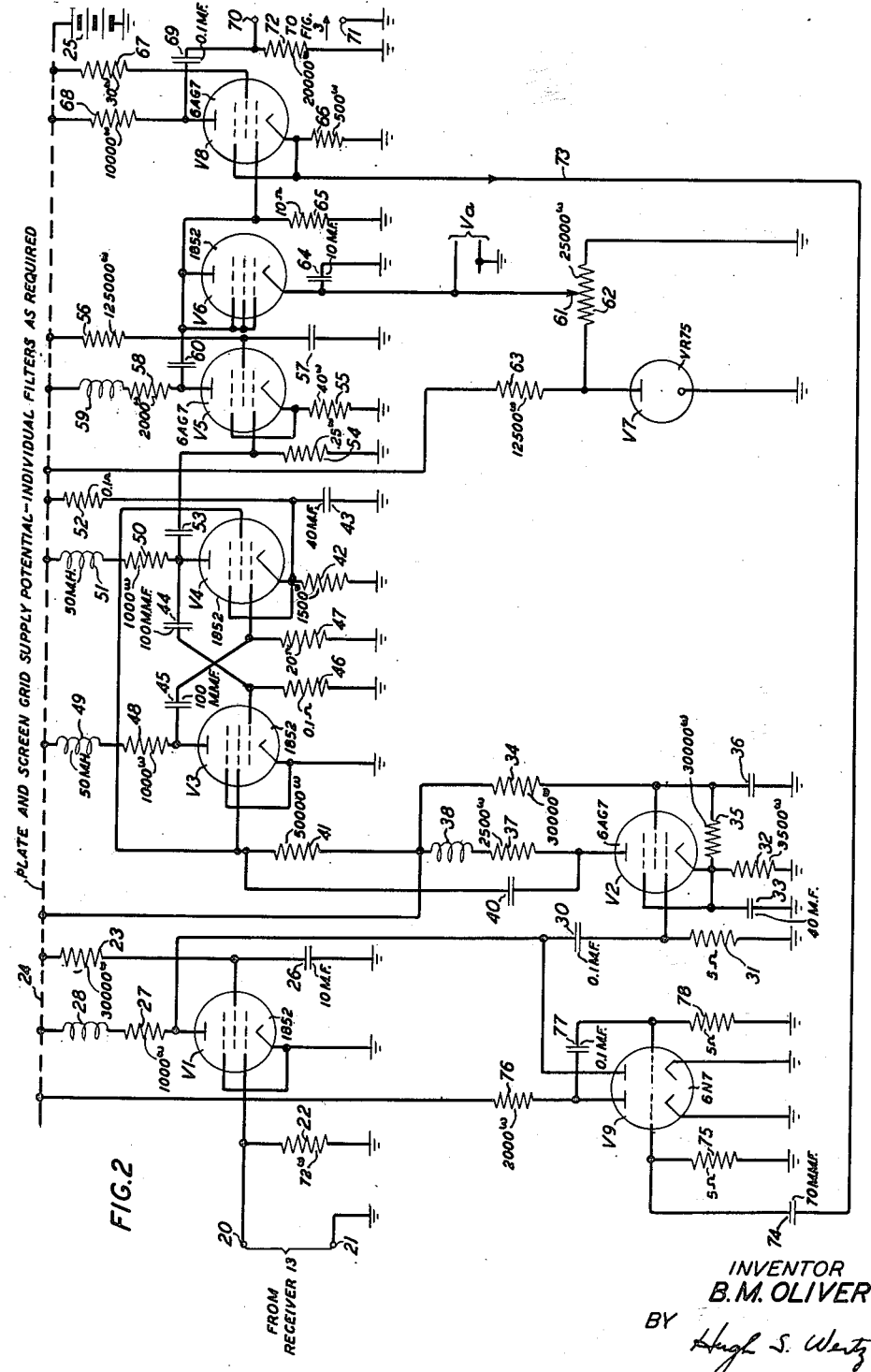
Figs. 2 and 3 are circuit diagrams of portions of the system shown in Fig. 1.
Figure 3:
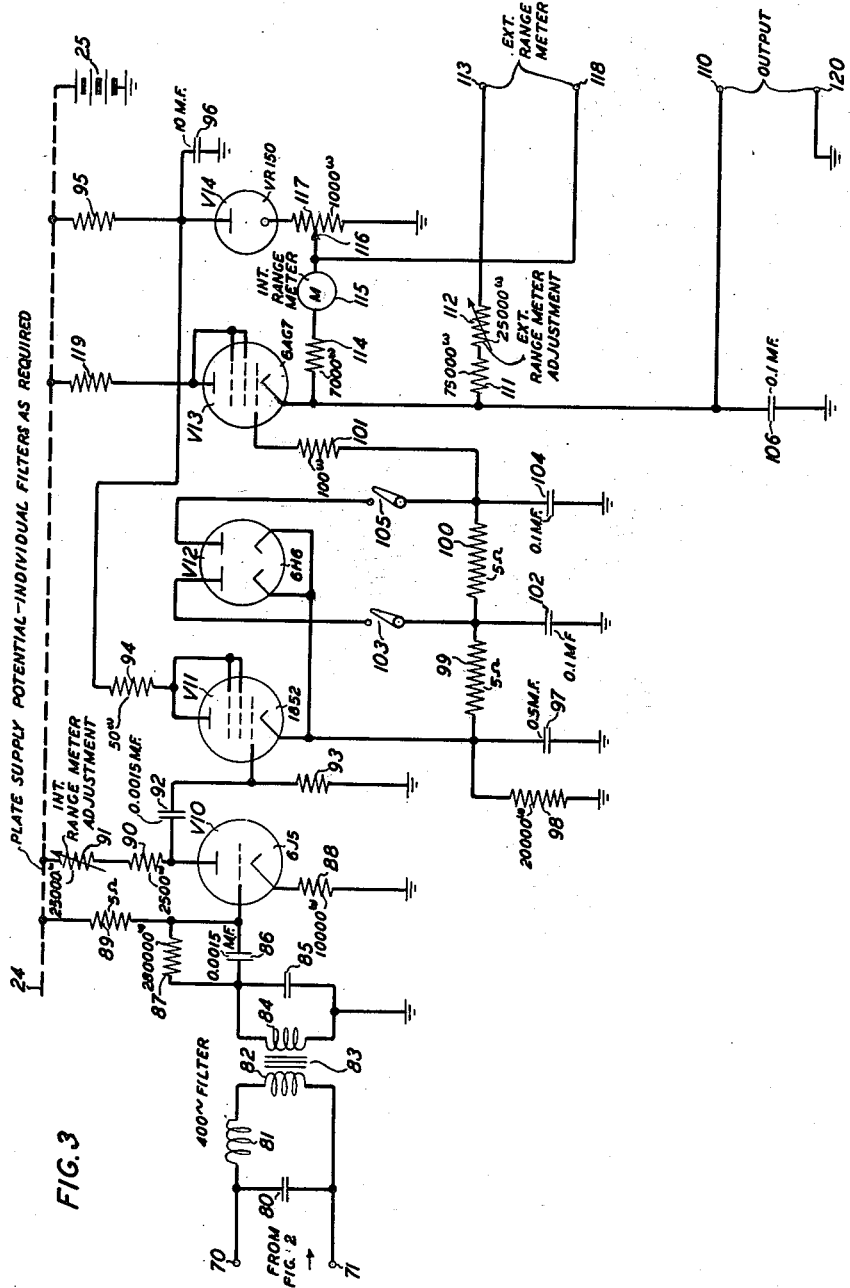

Reference will now be made to Figs. 2 and 3 in addition to Fig. 1 and Fig. 4 in describing the circuit 14. The output of the receiver 13 is connected to input terminals 20 and 21 of the tube V1, a resistor 22 being connected across the input terminals. The terminal 20 is connected to the control grid of the tube V1, while the cathode of this tube is grounded. The suppressor grid is connected to the cathode and the screen grid is connected through the resistor 23 to a terminal 24 which is connected to the positive pole of a source 25 which has been represented as a battery but which may be any suitable source of direct potential. The terminal 24 has been represented by short dashed lines in order to indicate that individual filters may be provided as required. The screen grid is also by-passed to ground through the condenser 26. The anode is connected to the terminal 24 through the anode resistor 27 and the equalizing inductance member 28. The anode of the tube V1 is connected through the coupling condenser 30 to the control grid of the tube V2, the leak resistor 31 being connected between this grid and ground. Bias for the tube V2 is supplied by means of the parallel-connected resistance member 32 and capacity member 33 which are connected between the cathode and ground. The cathode is placed at a positive potential with respect to ground by means of the resistors 34 and 35 acting with the resistor 32 to form a potential-dividing potentiometer. The suppressor grid of the tube V2 is connected to the cathode and the screen grid is connected through the resistor 34 to the terminal 24 and through the by-pass condenser 36 to ground. The anode is connected to the terminal 24 through the anode resistor 37 and the equalizing inductance member 38. The tube V2 is biased below cut-off so that only the peaks of the signals applied to the input circuit of this tube cause current to flow in the output circuit thereof. The input voltage of the tube V2 is indicated in line B of Fig. 4 and the output voltage thereof is shown in line C of this figure. These wave shapes will be explained hereinafter.

The output voltage of the tube V2 is applied by means of the coupling condenser 40 to the screen grids of the tubes V3 and V4. These grids are connected through the resistance member 41 to the terminal 24 to provide a positive potential thereon. The cathode of the tube V3 is connected to ground while the cathode of the tube V4 is connected to ground through the parallel-connected resistance member 42 and capacity member 43. In the absence of a pulse applied to the screen grids, only the tube V3 is conducting as the tube V4 is biased beyond cut-off. The suppressor grids of the tubes V3 and V4 are connected to their respective cathodes. The control grid of the tube V3 is connected through the coupling condenser 44 to the anode of the tube V4, while the control grid of the tube V4 is connected through the coupling condenser 45 to the anode of the tube V3. A leak resistor 46 is connected between the control grid of the tube V3 and ground while resistor 47 is connected between the control grid of the tube V4 and ground. The anode of the tube V3 is connected to the terminal 24 through the resistor 48 and equalizing inductance member 49, while the plate of the tube V4 is connected to the terminal 24 through resistance member 50 and inductance member 51. The cathode of the tube V4 is placed at a positive potential by means of the resistance member 52 acting with the resistance 42 as a voltage dividing potentiometer. The tubes V3 and V4 serve to produce on the plate of the tube V4 a wave of the type shown in Fig. 4, line E which is applied to the control grid of the tube V5 through the coupling condenser 53.

The control grid of the tube V5 is connected to ground through a resistor 54, while the suppressor grid is connected to the cathode and to ground through the resistor 55. The screen grid is connected to the terminal 24 through the resistor 56 and is by-passed to ground by means of the condenser 57. The anode of the tube V5 is connected to the terminal 24 through the resistance member 58 and the equalizing inductance member 59.

The anode of the tube V5 is connected to the control grid of the tube V8 through coupling condenser 60 and also through this coupling condenser to the anode of the tube V6, which is shown in the drawing as a pentode connected as a diode, the three grids being connected together and to the anode of the tube. The cathode of the tube V6 is connected to the tap 61 of the potentiometer 62 which is connected between ground and one terminal of the resistor 63, the other terminal of which is connected to the terminal 24. A voltage regulating tube V7 is connected across the resistance 62. The cathode of the tube V6 is also connected to ground through the condenser 64.

The control grid of the tube V8 is connected to ground through the leak resistor 65 and the cathode is connected to ground through the biasing resistor 66. The suppressor grid is connected to the cathode and the screen grid is connected to the terminal 24 through the resistor 67. The anode of the tube V8 is connected to terminal 24 through the resistor 68 and is connected to the terminal 70 (leading to the part of the circuit 14 shown in Fig. 3) through coupling condenser 69. A resistor 72 is connected between terminal 70 and the grounded terminal 71.

The cathode of the tube V8 is connected by means of a connection 73 and condenser 74 of small capacity to the grid of the left half of the tube V9. This grid is connected to ground through the resistor 75. The cathode of the tube V9 (left half) is connected directly to ground while the anode of this half is connected to the terminal 24 through the anode resistor 76. This anode is also connected through the coupling condenser 77 to the grid of the right half of the tube V9. This latter grid is connected to ground through the leak resistance 78. The cathode of this half is connected directly to ground and the anode thereof is connected to the terminal 24 through the resistance member 27 and the inductance member 28. This anode is also connected to the tube V2 through the coupling condenser 30. The grid voltage of the tube V2 is shown in Fig. 4, line B. As shown in this figure and as will be explained more fully below, only the first echo pulse 216 is large enough to have any effect on the operation of monovibrators V3 and V4, the action of the tube V9 serving to "squelch" the action of the other echo pulses 212, 213, etc. by lowering them below the cut-off line, hence, the name for this tube in Fig. 1.

The output terminals 70 and 71 of the tube V8 are connected to a 400-cycle filter comprising a condenser 80 connected across the terminals, an inductance member 81 connected to terminal 70, transformer 83, and capacity 85. The terminal of the inductance member 81 not connected to the terminal 70 is connected to one terminal of primary winding 82 of the transformer 83, the other terminal of this winding being connected to the terminal 71. Secondary winding 84 of the transformer 83 is shunted by condenser 85 and one terminal of this winding is connected to ground. The ungrounded terminal of the winding 84 is connected through the parallel-connected condenser member 86 and resistance member 87 to the grid of the amplifier tube V10, the cathode of which is connected to ground through the resistor 88. The grid of this tube is at a positive potential determined by the values of the resistor 89 connected to the positive terminal 24 of the source 25 and resistor 87. The anode of the tube V10 is connected through the resistance 90 and the variable resistance 91 to the terminal 24. The output voltage of the amplifier V10 is applied to the control grid of the tube V11 through a coupling condenser 92, this grid being connected to ground through a leak resistor 93. V11 is used as a triode as the suppressor grid, screen grid, and the anode of the tube V11 are connected together and to the terminal 24 of the source 25 through the resistor 94 and the resistor 95, the common terminal of these two resistors being connected to ground through the filter condenser 96. The cathode of the tube V11 is connected to ground through condenser 97 which is shunted by a resistance 98. This cathode is also connected to the two cathodes of the double diode tube V12 and through the resistance members 99, 100 and 101 to the control grid of the tube V13. The common terminal of the resistors 99 and 100 is connected to ground through condenser 102 and through a switch 103 to the anode of the left half of the double diode tube V12 while the common terminal of resistors 100 and 101 is connected to ground through the condenser 104 and through a switch 105 to the anode of the right half of the double diode tube V12. The resistance members 99 and 100 and the condensers 97, 102 and 104 serve as a smoothing filter.

The cathode of the tube V13 is connected to ground through by-pass condenser 106 and is also connected directly to an output terminal 110 which forms a pair of terminals with a grounded terminal 120. The cathode is also connected through resistances 111 and 112 to an output terminal 113 of an external range meter (not shown) and through a resistance 114 and an internal range meter 115 to an inner tap 116 of a resistor 117. The tap 116 is also connected to a terminal 118 of the external range meter. One terminal of the resistance 117 is grounded and the other terminal is connected through a voltage regulating tube V14 and the resistor 95 to the positive terminal 24 of the source 25. The anode of the tube V13 is also connected to this terminal through a resistor 119.

The operation of the circuit shown in Figs. 2 and 3 will now be described, reference also being made to the graphical representations of Figs. 4, 5 and 6. Voltage waves of the type shown in line A of Fig. 4 and comprising transmitted pulse 200 and echo pulses 201, 202, 203, etc., are applied to the input of the tube V1 which amplifies and phase inverts these signals. The output of the tube V1 and the output of the tube V9, the action of which will be explained below, are applied to the grid of the tube V2, the combined wave being shown in Fig. 4, line B. Pulse 210 of this combined wave corresponds to the transmitted pulse 200 and the pulses 211, 212 and 213 correspond to the echoes 201, 202 and 203. Were it not for the action of the squelch tube V9, the pulses 212 and 213 would be at the same general level as the pulse 211. As the anode of the tube V2 is connected to the screen grids of the tubes V3 and V4, both of these screen grids are driven negative upon the appearance of each pulse 221 (see Fig. 4, line C) in the output of the tube V2. The pulses 212 and 213, being below the cut-off line do not produce corresponding pulses in the output wave of V2. The plates and control grids of the tubes V3 and V4 are cross-connected to form a monovibrator. Before the appearance of a pulse 220 in the output of the tube V2, the tube V3 is conducting while the tube V4 is biased beyond its cut-off point. When the pulse 220, corresponding in position to the transmitted pulse 200, is applied to the screen grids of the tubes V3 and V4, these screen grids are both driven negative cutting off the tube V3 so that both tubes are non-conducting for the duration of the pulse 220. The plate voltage curve 230 for the tube V3 is shown in line D of Fig. 4 while the plate voltage curve of the tube V4 is shown in line E of Fig. 4, both curves 230 and 235 being at maximum voltage for the duration of the pulse 220. When the tube V3 is cut off, the positive pulse 230 is applied to the control grid of the tube V4 through the coupling condenser 45 but this latter tube does not become conducting during the time that the negative pulse 220 is applied to the screen grid of the tube V4. As soon as the pulse 220 terminates, however, the screen grids of both tubes V3 and V4 are driven in a positive direction, allowing the tube V4 to conduct and decrease its plate voltage sharply as shown in line E of Fig. 4. This causes a negative pulse to be applied to the control grid of the tube V3 through the coupling condenser 44 thus keeping the tube V3 cut off. After the first sharp dip, plate voltage of the tube V4 begins to rise due to the leakage of the charge on the condenser 44 through the resistance 46. If no further pulse appears for several microseconds after the pulse 220, the grid voltage of the tube V3 may rise to such an extent that the circuit will snap back after the manner of a monovibrator into its resting phase, that is, into its condition before the occurrence of the pulse 220. Should an echo pulse appear before this happens, however, the snap-back will be initiated by the echo pulse. Such a pulse is represented by the pulse 221 in line C of Fig. 4. This pulse again causes the screen grid of the tubes V3 and V4 to go negative, cutting off the tube V4 and causing a positive pulse to be applied to the control grid of the tube V3 but as this tube is cut-off by the negative pulse on its screen grid it cannot become conducting until pulse 221 terminates. When this latter even takes place, the tube V3 becomes conducting and the plate voltage thereof drops sharply as shown in line D of Fig. 4. The plate voltage of the tube V4 rises to its maximum or B+ potential coincidentally with the leading edge of the pulse 221. The monovibrator comprising the tubes V3 and V4 is then in the resting phase again and it stays in this phase indefinitely or until another pulse appears in its input circuit because even though the control grid of the tube V4 "leaks" clear up to ground potential, tube V4 will still be cut off by the bias on the cathode produced by the potentiometer resistors 42 and 52 connected between the terminal 24 of the source 25 and ground. It will be seen that the length of time the monovibrator remains in its "short" phase (as distinguished from its resting phase) and therefore the length of time the plate of the tube V4 is not at its B+ potential is equal to the time between the trailing edge of the transmitted pulse 200 and the leading edge of the first echo 201 as indicated by the dimension $\Delta t$ in line E of Fig. 4. $\Delta t$ therefore is equal to the pulse delay minus the width of the transmitted pulse. The negative pulse 235 from the plate of the tube V4 is applied to the control grid of the tube V5 and drives its grid past its cut-off point. The bottom irregularities are thus clipped off and in the plate circuit of the tube V5 there is produced a rectangular pulse 240 as shown in line F of Fig. 4. The potential of the top of this pulse is fixed on the right-hand side of the blocking condenser 60 by the diode V6 whose plate can never go appreciably more positive than the cathode the potential $V_a$ of which is, in turn, fixed by the voltage regulating tube V7 and the setting of the tap 61 on the potentiometer 62. This action limits the top of the pulse to a constant potential shown in line F of Fig. 4 as the voltage $V_a$. The cut-off potential of tube V8 is constant also so that the charge which flows through V8 will be proportional to $\Delta t$ and therefore to $\delta$, the delay, minus a constant. The cathode of the tube V8, being unbypassed, will accompany the grid of this tube on its positive excursions to produce a pulse 250 as shown in line H of Fig. 4. In addition to stabilizing the gain of tube V8, this cathode provides a low impedance source of a replica of the output pulse which is used to generate a blanking pulse or wave in the output of the tube V9. The cathode voltage wave 250 shown in line H of Fig. 4 is reshaped by the small capacity 74 and the grid-to-cathode resistance of the left-hand side of the tube V9 and the leak resistance 75 to form voltage waves 260 shown in line I of Fig. 4. The shaping of the voltage wave 250 is unsymmetrical since the grid resistance of the left-hand side of the tube V9 is much less than the resistance of the member 75.

The leading edge of the wave 250 drives the grid of V9 (left half) positive and the grid current quickly charges the small condenser 74. The trailing edge of pulse 250 then drives the grid of V9 (left half) negative, but now condenser 74 discharges very slowly through the leak 75. Thus, the exponential transient 261 in the negative direction is a thousand or more times longer than the positive exponential 262 and cuts the left-hand section of the tube V9 off for several hundred microseconds. By way of example, the length of the pulse 250 may be of the order of 50 microseconds or less and the pulses 200 may be of the order of 2500 microseconds apart. This cutting off of the first section of the tube V9 makes the second or right-half section conduct a large current and cut off the tube V2 so far that the pulses applied to the tube V1 after the first echo pulse 211, that is other and more distant echo pulses 212 and 213, for example, cannot cause conduction in V2. This action is shown in lines J, K and B of Fig. 4. The first of these lines (J) shows the input voltage 265 of the right-half of the tube V9 which comprises a small negative exponential 266 corresponding to the exponential 262 in the wave 260 and a relatively long positive pulse starting with the beginning of the negative pulse 261 in the wave 260 and terminating substantially at the time the pulse 261 reaches the cut-off line of the tube V9. The pulse 266, being below the cut-off line of the right half of the tube V9, does not appear in the plate current curve 270 shown in line K. A plate voltage wave corresponding to the plate current wave but in the opposite direction is applied to the control grid of the tube V2 along with the input to the tube V2 from the tube V1 to produce the wave shape shown in line B of this figure. As shown in line B of Fig. 4, echoes 212 and 213 later than the first one 211 used to restore the monovibrator or snap circuit comprising the tubes V3 and V4, therefore, are blanked out and have no effect on the monovibrator. By the time the blanking pulse on the grid of the tube V2 has vanished, so have all echoes and the circuit is ready for the next transmitted pulse 200. In this fashion the circuit is made to respond only to the transmitted pulse and the nearest echo. The output of the tube V8, as shown in line G of Fig. 4, consists of a negative pulse 245 of fixed amplitude and of a length proportional to the delay of the first echo pulse 201 (minus the pulse width). The area of this output pulse, therefore, is proportional to the delay and since the duty cycle is so short (assuming that the transmitted pulses 200 are approximately 2500 microseconds apart), the 400-cycle component present is proportional to their area. If, therefore, the 400-cycle component is extracted or filtered by means of the filter circuit comprising the condenser 80 and the inductance member 81, amplified in the tube V10, rectified in the tube V11 and then smoothed in the output amplifier V13 having a cathode follower output, a voltage is produced which is proportional to the area of the pulse 245 and hence is proportional to the range. This direct current output flows through the internal range meter 115 and through the external range meter (not shown) connected between the terminals 113 and 118. These meters are calibrated to read range in yards and thus give an accurate indication of the range to the target producing the first echo 201. The double-diode tube V12 is added to make the transient response of the filter, comprising the condenser elements 97, 102 and 104 and the resistance elements 99 and 100, directional. This is done to improve the response during fades of the desired echo. Should the first echo fade for a short time, the snap circuit comprising the tubes V3 and V4 will not be restored to its original phase at the proper time but will continue in the short phase until the next more distant echo, if any, or until its time constants restore it automatically to the long or resting phase. This means that during those cycles when the desired echo is below noise (fading period), the reading on the meter 115 will tend to increase from the proper reading to an erroneous higher reading. If a number of fades occur in not too frequent succession, the rectified potentials at the cathode of tube V11 will alternate between the proper potential (corresponding to the range of the desired target) and a higher potential corresponding to a more distant target (or maximum range if there is no more distant target within range). The output voltage of the tube V11 during the series of fades might be as shown in the solid line in Fig. 6. The time scale of Fig. 6 is quite different from that used in lines A to K, inclusive, of Fig. 4 as the time between two transmitted pulses 200 in Fig. 4 is approximately 2500 microseconds whereas the over-all time period for the curve shown in Fig. 6 is many seconds. The output voltage of the tube V11 during the series of fades is shown by the solid line portions of Fig. 6, the voltage corresponding to the true range being shown by the dotted line. Since the minimum values of the solid curve are always the correct ones sudden increases from these minimum values should be ignored in the output. The tube V12 allows the voltage on the grid of the tube V13 to climb slowly during the fades (shown in dashed lines) but fast enough to take care of true range changes, but snaps the potential back down to the minimum value when the pulse reappears by conducting at this time and shorting the resistances 99 and 100 which are very large, of the order of 5 megohms, and which form with the condensers 97, 102 and 104 the long time constant of the rise.

The switches 103 and 105 are provided for removing the tube V12 from the circuit if it is desired to do so. The current in the tube V14, which is a voltage regulator tube, is used to buck some of the current of the tube V13 in order to produce zero reading at zero range on both of the meters. The zero setting is obtained by varying the position of the tap 116 on the resistor 117 in series with the tube V14. By controlling the amplification of the stage including tube V10 (by adjusting the setting of the resistor 91) the scale of the internal range meter is adjusted. An additional adjustment for the scale of the external or remote indicating meter to make the two meters agree is accomplished by adjusting the resistor 112. Both of the meters are voltmeters and they are connected in parallel.

The output terminals 119 and 120 may go to any other form of potential indicator or null-setting device, such as a servo-comparator.

If it is desired to obtain the range to targets other than the nearest one, a blanking circuit can be added which supresses all video signals for a certain time after each transmitted pulse. The first echo beyond this excluded range will then restore the monovibrator, while nearer echoes will have no effect. Obviously it might be desirable to make the duration of this blanked interval variable and automatically adjusted to a value slightly less than the delay time of the desired echo. A blanking tube connected into the circuit in the same way as V9 but arranged to operate off the transmitted pulse can be used to accomplish this action.

Circuit constants for an operative arrangement constructed in accordance with this invention have been shown on the drawings, but it is obvious that the invention is not limited to the use of elements having these particular circuit constants.

While there have been shown and particularly described a certain embodiment of the invention and a method of operation embraced therein for the purpose of explaining its principles and showing its applications, it will be obvious to those skilled in the art that many modifications and variations are possible and it is therefore intended to cover all such modifications and variations as fall within the scope of the invention which is defined in the claims.

What is claimed is:

1. A circuit for measuring the time interval between one of a series of pulses emitted at a given repetition frequency and a first echo produced by said pulse comprising means for producing a square-top pulse which is started substantially coincident with said emitted pulse and is terminated substantially coincident with said first echo, means for extracting from said square-top pulse a frequency component corresponding to the repetition frequency of said emitted pulses, and means for rectifying and filtering the voltage of said frequency to produce a direct voltage, representative of the intensity of said frequency component, which is a measure of the time interval between the emitted pulse and the first echo.

2. In combination, two electron discharge devices each comprising an anode, a cathode and a first and a second grid, means for connecting the first grid of each of said tubes to the anode of the other of said tubes, means for connecting a biasing potential between the first grid of the first one only of said tubes and the cathode thereof sufficient to cause said tube to be normally cut off in the absence of pulses applied to the second grid, the second of said tubes being normally conducting, said means for coupling said first grid and said anode comprising time constant circuits, means for applying a series of negative pulses to the second grid of each of said tubes, whereby the one of said tubes which is not cut off becomes non-conducting on the application of the first pulse in the series to the second grid thereof thereby applying a positive pulse to the first grid of the other tube which continues to be cut off because of the negative pulse applied to the second grid thereof until the termination of the first pulse in the series whereupon it becomes conducting until the start of the next pulse.

3. In combination, means for producing a series of transmitted pulses, means for producing from each pulse in the first series a reflection or echo pulse but which reflections or echo pulses may fade from time to time, means for producing from the echo pulses and the transmitted pulses a series of square-topped pulses each having a duration corresponding to the time interval between a transmitted pulse and its corresponding echo pulse and having a constant amplitude, said last-mentioned means being characterized in that when one of said echo pulses fades the square-topped pulse produced thereby is of much longer duration than the time interval between the transmitted pulse and its corresponding echo pulse, means including a rectifier and a filter circuit for producing a direct current intended to be representative of the duration of said square-topped pulses, but which produces a current of increased amplitude when there is an increase in the duration of said square-topped pulse, and means for shorting portions of said filter during fades to reduce the current output of said filter.

BERNARD M. OLIVER.

REFERENCES CITED

The following references are of record in the file of this patent:

UNITED STATES PATENTS

| Number | Name | Date |
|---|---|---|
| 1,585,591 | Lowy | May 18, 1926 |
| 2,134,716 | Gunn | Nov. 1, 1938 |
| 2,141,343 | Campbell | Dec. 27, 1938 |
| 2,189,549 | Hershberger | Feb. 6, 1940 |
| 2,192,189 | Haffcke | Mar. 5, 1940 |
| 2,208,422 | Hugon | July 16, 1940 |
| 2,227,598 | Lyman et al. | Jan. 7, 1941 |
| 2,275,016 | Koch | Mar. 3, 1942 |
| 2,277,000 | Bingley | Mar. 17, 1942 |
| 2,287,174 | Heising | June 23, 1942 |
| 2,300,876 | Dickinson | Nov. 3, 1942 |
| 2,306,386 | Hollywood | Dec. 29, 1942 |
| 2,370,692 | Shepherd | Mar. 6, 1945 |
| 2,384,379 | Ingram | Sept. 4, 1945 |
| 2,403,527 | Hershberger | July 9, 1946 |
| 2,404,527 | Potapenko | July 23, 1946 |
| 2,412,111 | Wilson | Dec. 3, 1946 |
| 2,416,286 | Busignies | Feb. 25, 1947 |
| 2,421,018 | De Rosa | May 27, 1947 |
| 2,422,449 | Usselman | June 17, 1947 |
| 2,422,698 | Miller | June 24, 1947 |
| 2,442,403 | Floy et al. | June 1, 1948 |

FOREIGN PATENTS

| Number | Country | Date |
|---|---|---|
| 474,739 | Great Britain | Nov. 8, 1937 |
| 497,147 | Great Britain | Dec. 9, 1938 |

OTHER REFERENCES

Review of Scientific Instruments, December 1937, vol. 8, pages 502 to 504.